May 20, 1952 A. H. A. WYNN 2,597,142
RADIO RECEIVER CIRCUITS
Filed Dec. 14, 1946
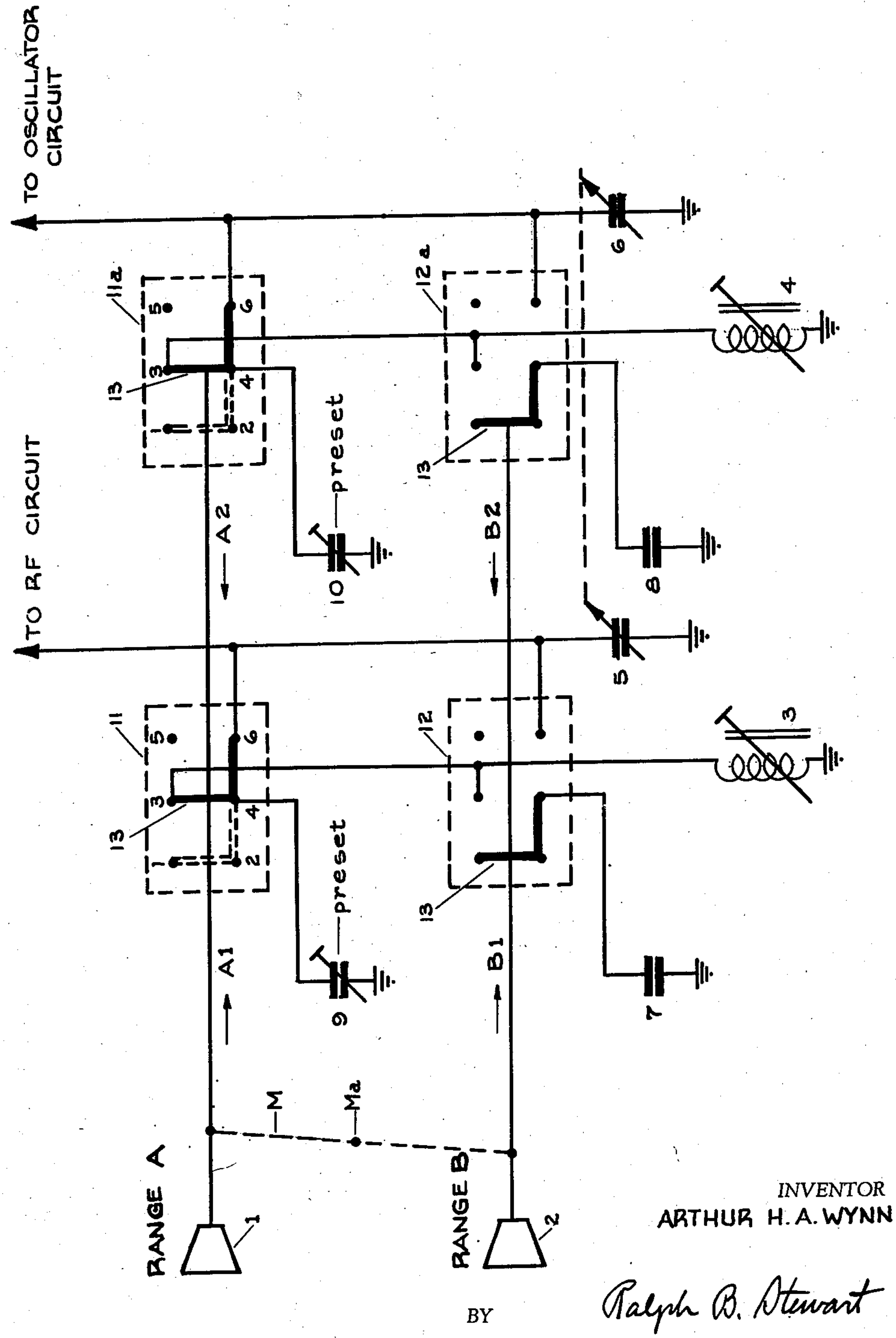
INVENTOR
ARTHUR H. A. WYNN
BY Ralph B. Stewart
ATTORNEY Patented May 20, 1952 2,597,142

UNITED STATES PATENT OFFICE 2,597,142

RADIO RECEIVER CIRCUITS

Arthur Henry Ashford Wynn, London, England, assignor to A. C. Cossor Limited, London, England, a British company Application December 14, 1946, Serial No. 716,201
In Great Britain December 20, 1945

4 Claims. (Cl. 250—40)

This invention relates to radio receivers and more particularly to receivers adapted for reception on a plurality of wave bands.

In a radio receiver there is at least one variable tuned circuit, i. e. an inductor and a capacitor in parallel, one of these reactive elements, usually the capacitor, being variable to permit of the selection of any one frequency within a certain frequency band. When a receiver is to be capable of receiving on a plurality of frequency bands, an alternative or additional reactive element must be introduced in each variable tuned circuit: thus a second inductor may replace the first, or further capacitance may be introduced in parallel with that of the variable capacitor. In determining the arrangement to be used the designer will be guided by the consideration, inter alia, that an inductor is usually a more expensive component than a comparable capacitor, so that the latter of the above-suggested methods is likely to be adopted. Other considerations, more particularly in point with respect to the present invention, are that a fixed capacitor is a less expensive component than a semi-fixed (trimmer or preset) capacitor, that a preset capacitor of small capacitance is more practicable of manufacture than one of larger capacitance, and that the capacitance of a tuned circuit decreases as its frequency increases.

With these and similar considerations in mind, it is an object of the present invention to simplify and cheapen the manufacture of a multi-frequency-band receiver, and more particularly to facilitate the process of lining up the circuits after their assembly.

In accordance with one feature of the invention as it is at present conceived a receiver adapted for receiving on at least two frequency bands has a single semi-fixed inductor and a single variable capacitor for two frequency bands in a fixed capacitor for the one and a semi-fixed capacitor for the other frequency band, so that in the process of lining up it is only necessary to make one adjustment for each band, namely, an adjustment of the inductor in respect of the one band and after that an adjustment of the semi-fixed capacitor in respect of the other band.

Since, as above stated, the larger capacitance is that pertaining to the lower frequency band, it is preferred that the one band, i. e., that using the fixed capacitor, shall be of lower frequency than the other band, using the semi-fixed capacitor.

By a variable component is meant one which can at any time be set by the user to any value within a considerable range and subsequently be changed to any other value equal readily, for this purpose being accessible from the exterior of the receiver during normal use: by a semi-fixed or pre-set component is meant one which is adjustable, perhaps within a small range only, during some initial lining up process, and is intended to remain as so set thereafter, being therefore usually inaccessible from the exterior of the receiver during normal use and often requiring the use of a special tool such as a screwdriver for its manipulation.

In an embodiment of the invention as applied to a superheterodyne receiver having a push button for each of two frequency ranges there is a single inductor for the R. F. tuned circuit and a single inductor for the local oscillator tuned circuit; similarly there is a single variable capacitor for each, the two capacitors being ganged in well known manner. For the lower frequency range there is a fixed capacitor for each tuned circuit and for the higher frequency range there is a pre-set capacitor for each; these capacitors being switched by the push buttons into or out of circuit in parallel with the respective variable capacitor. The inductors are of pre-set type, being adjustable by means of a variable dust core.

In lining up the receiver for the several ranges a definite procedure is followed. First the lower frequency push button is depressed. At some selected "spot" frequency within the range and some corresponding selected position of the ganged variable capacitors the R. F. inductor is then locked in the position as adjusted. Next the higher frequency push button is depressed (releasing the other mechanically) and at some selected spot frequency within this second range and some corresponding selected position of the ganged variable capacitors the pre-set capacitor is adjusted until the circuit is tuned. The local oscillator is dealt with similarly, remembering that its frequencies are always to differ from those of the R. F. stage by the amount of the intermediate frequency.

The following description relates to the accompanying drawing which shows a circuit pertaining to one embodiment of the invention.

The circuit shown in the drawing is part of a superheterodyne receiver which, as is well known, requires provision for variable tuning both in the R. F. stage and in the local oscillator. In the R. F. stage there is a fixed inductor 3 paralleled by variable capacitor 5; similarly in the local oscillator circuit there is a fixed inductor 4 paralleled by a variable capacitor 6. There variable capacitors 5 and 6 are mechanically ganged in well-known manner.

The receiver is intended for reception of two wave bands, being provided with push buttons 1 and 2 for selection of the band. These push buttons are mechanically interlocked so that only one can be depressed at a time. Suitable mechanical interlocking is represented by the dotted mechanical connection M pivoted at the point *Ma*. As shown the push button 1 and associated parts pertain to the higher frequency range, while push button 2 pertains to the lower frequency range. The push buttons 1 and 2 control the switches 11 and 12 in the R. F. stage of amplification and the switches 11*a* and 12*a* in the local oscillator tuning circuit. These switches are all of comparable pattern, the moving elements consisting of L-shaped conductor members 13 which are engageable with contact studs arranged in pairs so that a set of three contact studs can be interconnected at a time. For operation in range A push-button 1 is moved in the direction of arrow A1 which effects movement of the button 2 in the direction of the arrow B2, and for operation in range B, the buttons move in the direction of arrows B1 and A2 respectively. As shown in the drawing, the arrangement is set for operation in range A.

In the R. F. circuit there is a fixed capacitor 7 for use in the lower frequency range and a trimmer capacitor 9 for use in the upper frequency range. Similarly in the local oscillator tuning circuit there is a fixed capacitor 8 for the lower frequency range and a trimmer capacitor 10 for the higher frequency range.

The switches are so arranged that when a push button 1 or 2 is depressed, i. e., moved to the right as in the drawing, the corresponding trimmer or fixed capacitors are put in parallel with the single variable capacitor in that circuit.

In lining up the receiver for the several ranges a definite procedure is followed. First the lower frequency push button is depressed. At some selected "spot" frequency within the range and some corresponding selected position of the ganged variable capacitors 5 and 6 the R. F. inductor 3 is adjusted to its correct value and then locked in the position as adjusted. Next the higher frequency push button 1 is depressed (releasing the other mechanically) and at some selected spot frequency within this second range and some corresponding selected position of the ganged variable capacitors 5 and 6 the pre-set capacitor 9 is adjusted until the circuit is tuned. The local oscillator is dealt with similarly, remembering that its frequencies are always to differ from those of the R. F. stage by the amount of the intermediate frequency.

As is well known, single point alignment as above described is more satisfactory with receivers having a small frequency coverage, commonly known as band spread receivers, than it is with receivers in which the frequency band has a large coverage; so that it is with band spread receivers that the invention may be expected to be more useful.

I claim:

1. In a radio receiver for receiving a band of high frequency waves and a band of low frequency waves, a tuned circuit comprising a single pre-set variable inductor whose inductance is variable over only a small range, a single tuning capacitor connected directly in parallel with said inductor and being variable to vary the frequency of said tuned circuit throughout the frequency ranges of both the high frequency band and the low frequency band, switching means having a high frequency band positioned and a low frequency band positioned, a pre-set capacitor whose capacitance is variable over only a small range and being connected in shunt to said inductor by said switching means in the high frequency band position thereof, and a fixed capacitor of greater capacity than said pre-set capacitor connected in shunt to said inductor by said switching means in the low frequency band position thereof.

2. In a radio receiver for receiving a band of high frequency waves and a band of low frequency waves, a tuned circuit comprising a single semi-fixed inductor whose inductance is variable over only a small range, a single variable tuning capacitor connected directly in parallel with said inductor and being variable to vary the frequency of said circuit throughout the frequency ranges of both said high frequency band and said low frequency band, a fixed capacitor for one of said frequency bands, a semi-fixed capacitor for the other frequency band and having its capacitance variable over only a small range, and a two-position switching means arranged to connect said fixed capacitor and said semi-fixed capacitor alternately in parallel with said inductor, whereby in the process of lining up the tuning of said circuit it is only necessary to make one adjustment for each band, namely, an adjustment of the inductor in respect of one band, and after that an adjustment of the semi-fixed capacitor in respect of the other band.

3. The method of lining up the operation of the tuned circuit specified in claim 1 which comprises placing said switching means in its low frequency band position, setting said tuning capacitor at a predetermined frequency within said low frequency band, adjusting said variable inductor until said circuit is tuned to said predetermined value, shifting said switching means to its high frequency band position, setting said tuning capacitor at a frequency within said high frequency band, and adjusting said pre-set capacitor to tune said circuit to said second-mentioned frequency.

4. A tuning arrangement for a superheterodyne radio receiver for selectively receiving waves in a high frequency band and in a low frequency band comprising, in combination, a tuned radio frequency receiver circuit and a tuned oscillator circuit, each circuit including a single pre-set variable inductor whose inductance is variable over only a small range, a variable tuning capacitor connected directly in shunt to the inductor in said receiving circuit and being variable to tune said circuit throughout the ranges of said high frequency band and said low frequency band, a variable capacitor connected in shunt with the inductor in said oscillator circuit and being variable to tune said oscillator circuit throughout the appropriate frequency range for said high frequency band and said low frequency band, means connecting said variable capacitors for ganged operation to maintain a fixed difference in resonant frequency between said receiver and oscillator circuits, switching means having a high frequency band position and a low frequency band position, a pre-set capacitor whose capacitance is variable over only a small range and being connected in shunt to each of said inductors by said switching means in the high frequency band position thereof, and a fixed capacitor of greater capacity than said pre-set capacitor connected in shunt to each of said inductors by said switching means in the low frequency band position thereof.

ARTHUR HENRY ASHFORD WYNN.

REFERENCES CITED

The following references are of record in the file of this patent:

UNITED STATES PATENTS

| Number | Name | Date |
|---|---|---|
| 1,658,718 | Hardcastle | Feb. 7, 1928 |
| 1,992,805 | Becker | Feb. 26, 1935 |
| 2,029,461 | Brush | Feb. 4, 1936 |

| Number | Name | Date |
|---|---|---|
| 2,065,652 | Carlson | Dec. 29, 1936 |
| 2,141,756 | Linsell | Dec. 27, 1938 |
| 2,148,633 | MacDonald | Feb. 28, 1939 |
| 2,209,959 | Chittick | Aug. 6, 1940 |
| 2,301,934 | Edwards | Nov. 17, 1942 |
| 2,354,148 | Shaw | July 18, 1944 |
| 2,434,299 | Van Loon | Jan. 13, 1948 |
| 2,538,438 | Bedford et al. | Jan. 16, 1951 |
| 2,538,439 | Bedford et al. | Jan. 16, 1951 |

OTHER REFERENCES

"Automatic Tuning Devices," Radio News, April, 1939, by Queen, (page 17).